US008386599B2

(12) United States Patent
Fomitchev

(10) Patent No.: US 8,386,599 B2
(45) Date of Patent: Feb. 26, 2013

(54) METHOD AND SYSTEM FOR ESTIMATING UNIQUE VISITORS FOR INTERNET SITES

(76) Inventor: Max Fomitchev, State College, PA (US)

( * ) Notice: Subject to any disclaimer, the term of this patent is extended or adjusted under 35 U.S.C. 154(b) by 488 days.

(21) Appl. No.: 12/397,797

(22) Filed: Mar. 4, 2009

(65) Prior Publication Data

US 2010/0228850 A1   Sep. 9, 2010

(51) Int. Cl.
*G06F 15/173* (2006.01)
(52) U.S. Cl. .............................. 709/224; 340/3.1; 702/1
(58) Field of Classification Search .................. 709/224, 709/223
See application file for complete search history.

(56) References Cited

U.S. PATENT DOCUMENTS

| | | | | |
|---|---|---|---|---|
| 7,376,722 | B1 * | 5/2008 | Sim et al. ....................... | 709/223 |
| 2003/0208594 | A1 * | 11/2003 | Muret et al. ................... | 709/224 |
| 2004/0243704 | A1 * | 12/2004 | Botelho et al. ................ | 709/224 |
| 2009/0099904 | A1 * | 4/2009 | Affeld et al. ................... | 705/10 |

* cited by examiner

*Primary Examiner* — Jude Jean Gilles
*Assistant Examiner* — Jaren M Means

(57) ABSTRACT

This invention comprises a method and system for estimating unique visitors for Internet sites that is more accurate than the existing unique cookie/unique address counting methods. The invented method relies on the count of unique user identifiers (such as network addresses or preferably cookies)—I—that can be obtained from an existing cookie tracking/user access logging system. The number of unique visitors U is calculated substantially as a ratio of the count of unique cookies (or unique network addresses) to the number of visits N times the inflation factor X plus constant on that is approximately one (exactly one in the case of cookies). The number of visits is calculated by multiplying the sampling period t to the visitation frequency $T^1$ minus one. The resulting estimate of the unique visitors is stable and does not diverge with sampling time unlike estimates directly obtained from the unique network address or unique cookie counts. The method is also applicable when there are multiple dominant visitation frequencies by accounting to the sum by all significant visitation frequencies. All key parameters of the method can be established before hand by mining a multitude of the site's historical visit logs and/or third party site access logs; the parameters can be corrected/calculated dynamically by mining the site's current access log (or current third party logs) while focusing on unambiguously identified visitors (such as return visitors identified by their login ID or unchanged cookie value).

16 Claims, 7 Drawing Sheets

The count of unique network addresses (IPs) per user increases with time.

Figure 1. The count of unique network addresses (IPs) per user increases with time.
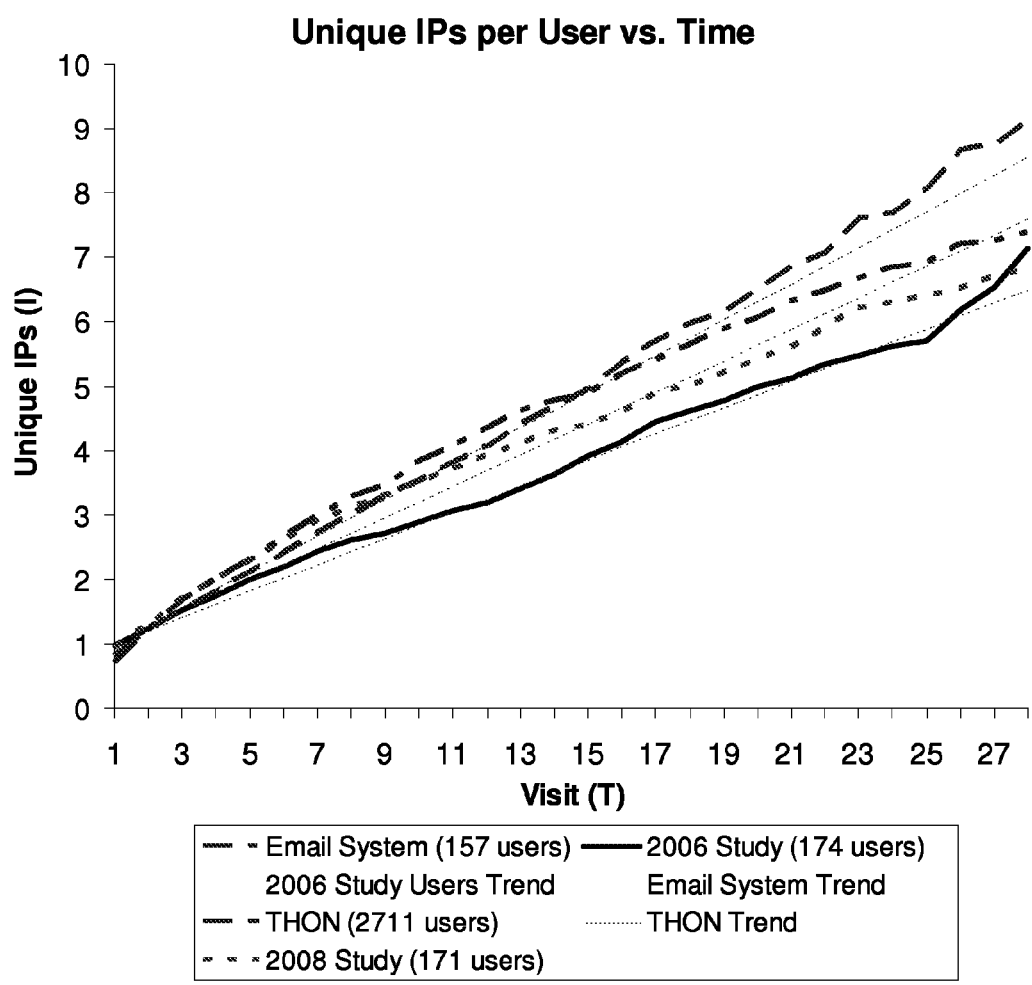

Figure 2. The count of unique cookies per user increases with time.
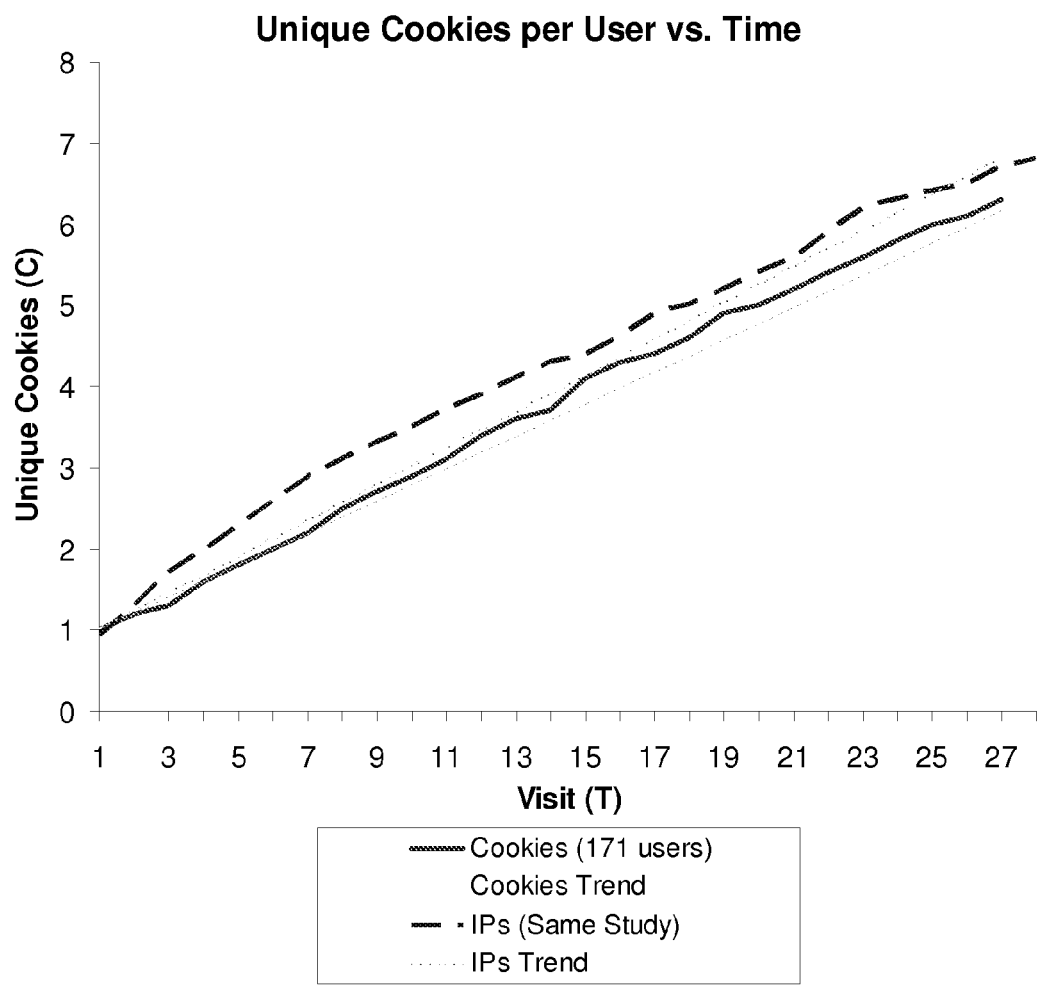

Figure 3. Formulas for calculating unique visitors from unique network address or unique cookie counts.

$$U = \frac{I}{C_0 + X \cdot N} \quad (1)$$

$I$ – count of unique network addresses (or unique cookies)

$U$ – count of unique visitors $X$ – empirical inflation factor ($X \approx 0.3$)

$N$ – visit number $C_0 = 1$ for cookies, $C_0 \leq 1$ for unique IP address ($C_0 \approx 1$)

$$N = t \cdot T^{-1} - 1 \quad (2)$$

$N = 0, 1, 2...$ $t$ – sampling period $T^{-1}$ – visitation frequency $$U = \frac{I}{\sum_{k=1}^{K} q_k (C_k + X_k \cdot N_k)} \quad (3)$$

$q_k$ – the fraction of the core audience with the visitation period $T_k$ ($0 < q_k < 1$)

$K$ – number of significant visitation frequencies $C_k = 1$ for cookies, $C_k \leq 1$ for unique IP address ($C_k \approx 1$)

Figure 4. General unique visitors estimation process.
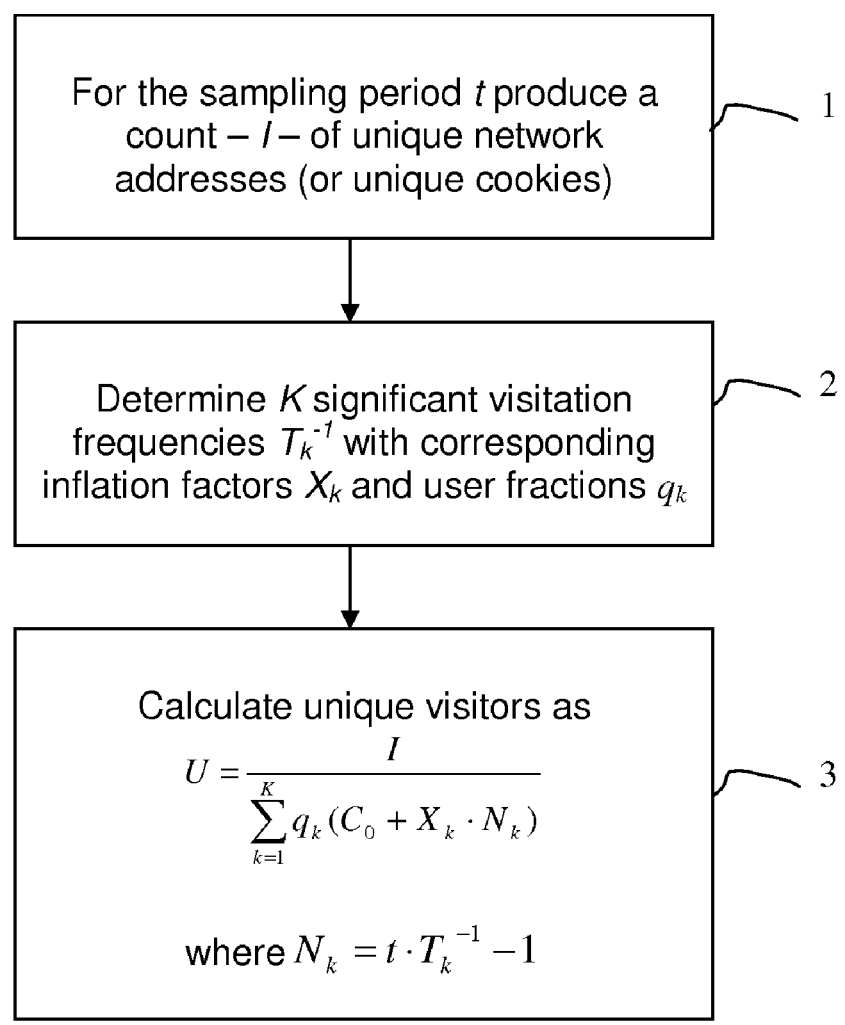

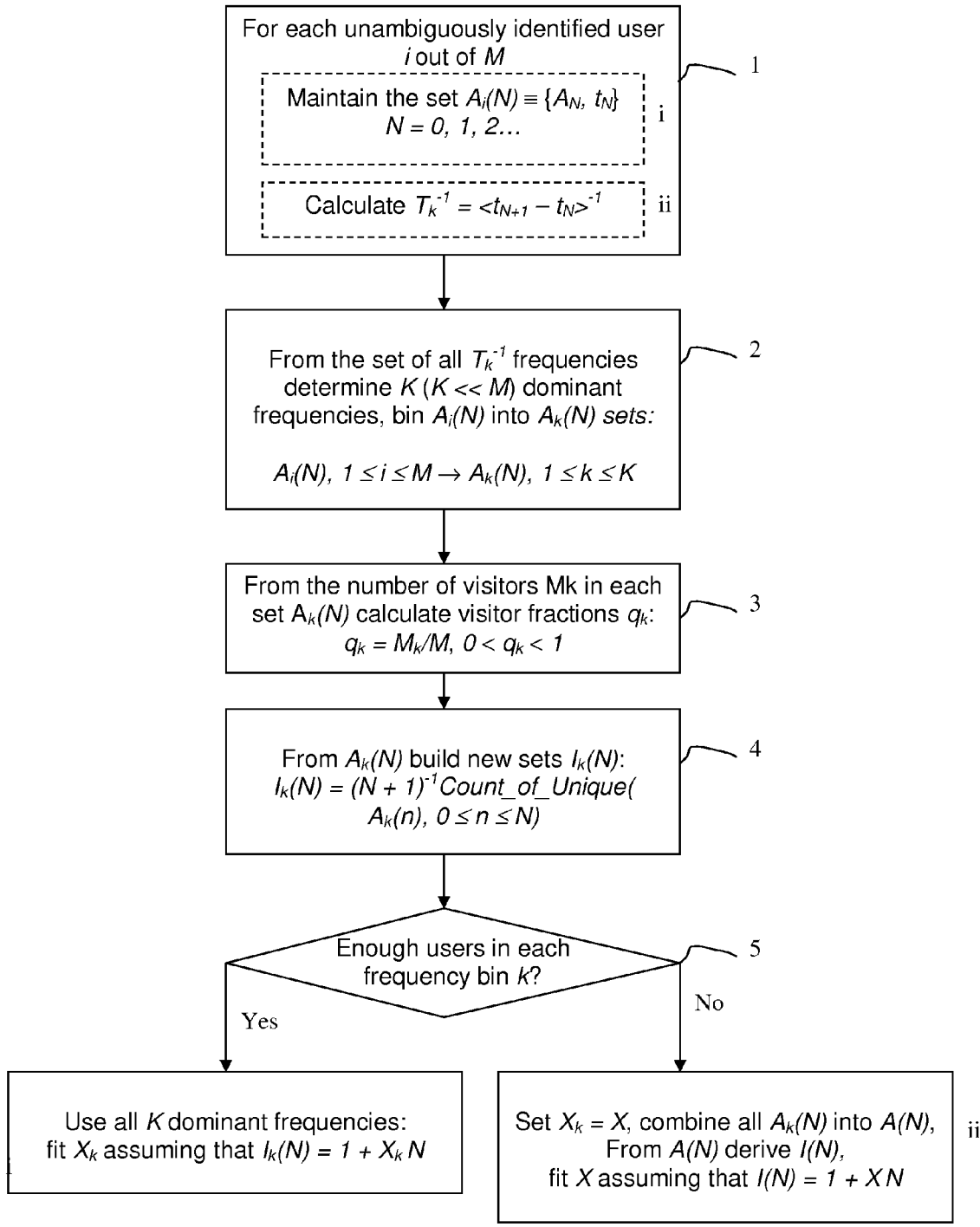
Figure 5. The process of determination of inflation factors $X_k$, visitation frequencies $T_k^{-1}$, and fractions $q_k$.

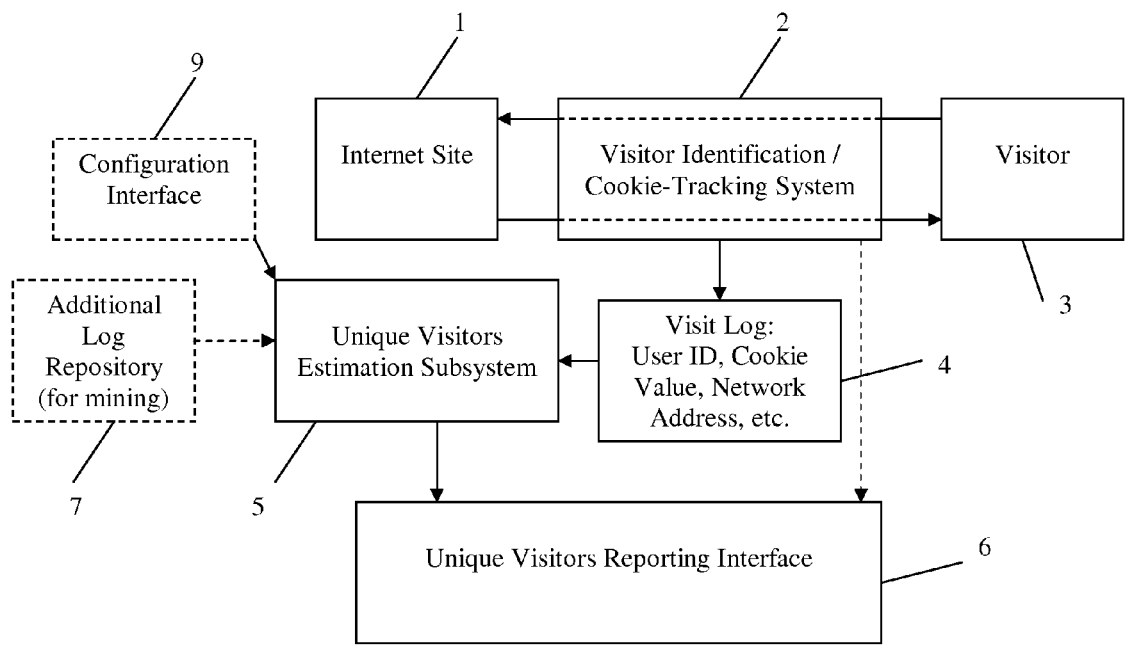
Figure 6. Preferred system for determining the unique visitors.

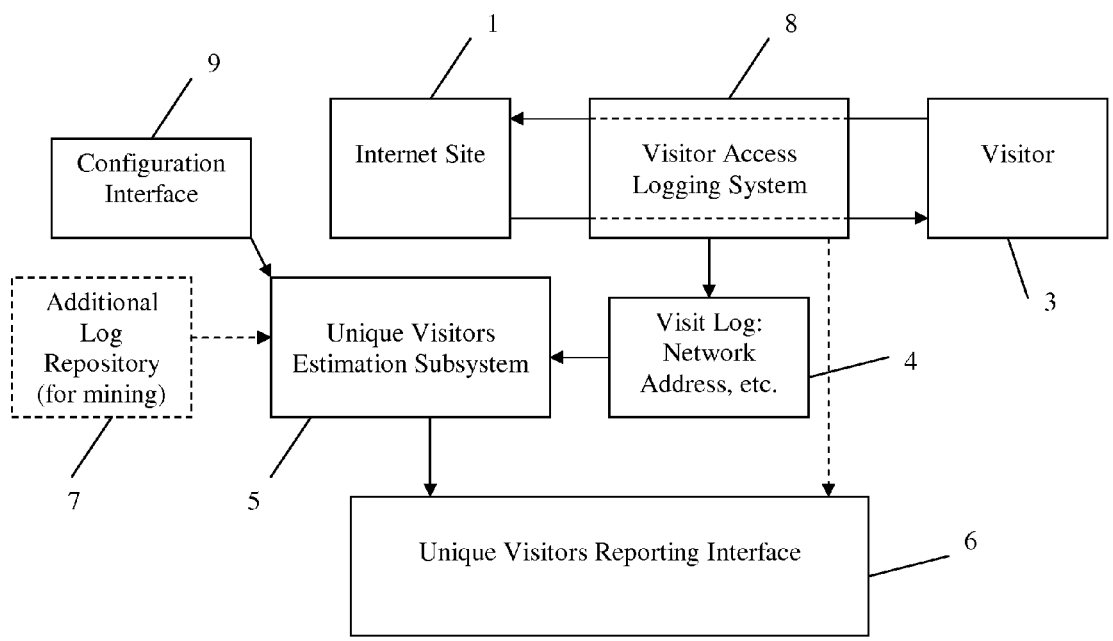
Figure 7. Alternative system for determining the unique visitors.

METHOD AND SYSTEM FOR ESTIMATING UNIQUE VISITORS FOR INTERNET SITES

FIELD OF INVENTION

This invention relates generally to Internet marketing and specifically to unique visitor identification problem, which is the principle uncertainty in assessing the size of the market (i.e. core audience size) reachable via Internet advertisement.

BACKGROUND

When we advertise we want to know the size of the market we are advertising to. We want to know how many potential customers our advertisement will reach and we use this number to estimate sales and control the cost of advertising. Since the price of advertisement charged by content providers (such as newspapers, TV networks, radio stations, Internet sites, etc.) usually depends on the reach knowing the reachable audience size is extremely important for determining the cost effectiveness of advertisement and estimating return on investment—ROI—as a ratio of the projected sales revenue to the cost of advertising.

While for the traditional-media advertising (i.e. TV, radio, print, etc.) methods for estimating the reach are well developed, the same methods cannot be applied for the new-media advertising (such as advertising on Internet). The traditional-media advertising uses the number of subscribers as a fair approximation of the reach; radio advertising relies on manual call-out marketing to estimate the audience size. Internet advertisement in general is not delivered to subscribers while expensive and tedious call-out marketing is almost universally replaced with computerized unique visitor estimation techniques based on analysis of site access logs.

The two most popular unique visitor estimation techniques for Internet advertisement include the count of unique network addresses (such as IP addresses) mined from site access logs [1, 2, 3] or the count of unique "cookies" [4] also mined from site access logs [5].

The problem with the first method is that network addresses change over time; therefore the same visitor may be assigned a different network address upon a return visit and thus be misidentified as a new visitor. Furthermore network addresses are also reused; therefore two distinct visitors may share the same network address on subsequent visits and thus be misidentified as one. No formal research in the area has been conducted until now [6] and the obtained results sharply contradict currently accepted notion in the field that the ratio of unique network addresses to unique visitors is constant and is on the order of 1. The research conducted by the author [6] has revealed that the ratio of unique network addresses to unique visitors is not constant and grows linearly with sampling time and with visitation frequency. In other words if an Internet site reports 1,000,000 unique visitors per month basing this number on the count of unique network addresses the actual number of unique visitors may be 30 times less (e.g. ~30,000) if majority of users—the core audience—visit the site twice daily.

The potential inaccuracy of the network address counts as a measure of unique visitors has been realized before and a new method of unique visitor identification based on "cookies" has been developed [5]. "Cookie" is a persistent and unique token of information that is submitted (typically by Web Browser) to Internet site in order to identify a user on a return visit. When a new user comes in a new unique cookie value is generated to identify the user on a return visit. Currently cookie-tracking methods are considered the most reliable and amount to industry standard in unique visitor identification. Google Analytics, Yahoo, SpyLog and other online content rating providers rely on this method for calculating the unique visitor numbers. Potential problems that negatively impact the accuracy of the cookie-tracking method include cookie clearing by users (both periodic and sporadic, including deletion of cookies by software such as Antivirus or disk cleaning programs) and explosive proliferation of Internet access points and devices such as smart phones, PDAs, pocket PCs, game consoles, notebook PCs, etc. Since cookies are specific to each device, a person that uses 10 such devices will appear as 10 unique visitors to a cookie-tracking system. Currently the impact of cookie clearing and Internet access device proliferation is vastly neglected and unique cookie counts are nevertheless used as a direct measure of unique visitors. The research conducted by the author [6] revealed that cookies are subject to the same "explosion" mechanism as network addresses: the ratio of unique cookie counts to unique visitors is not constant and grows linearly with sampling time and the growth factor increases with the increase of visitation frequency. The author's findings on the cookie clearing impact (which is only one of contributing factors of inaccuracy) corroborate similar data recently reported by comScore [7].

Thus cookies are about just as inaccurate in estimating unique visitors as unique network addresses. This is the new and unrealized fact in the industry that has a direct impact on Internet advertising as currently reported unique visitor/core audience size numbers tend to overestimate the true audience size by a large factor (7-30, depending on the visitation frequency and the sampling period). Also, cookies are not supported by all Internet access hardware/software devices and generally cannot be used with Internet audio/video streams thus further limiting the area of cookie-tracking applicability.

To remedy the problem the author has invented a new, novel and highly unobvious method for estimating unique visitors discussed below.

OBJECTS AND ADVANTAGES

The key advantage of the present invention is that the invented method of unique visitors estimation is markedly more accurate than the existing unique-network-address-counting and unique-cookie-tracking methods. Another advantage of this invention is simplicity and ease of implementation: the invented method can be implemented as an add-on to an existing cookie or network address-based visitor identification system.

SUMMARY OF INVENTION

I hereby disclose a method for unique visitor identification using the data extracted from the Internet site access logs.

The method operates under the assumption that the meaningful traffic is periodic, i.e. that the site has a core audience that visits the site regularly. It is our task to estimate this core audience size, which is the unique visitors number. While there are going to be additional unique visitors outside of the core audience (i.e. visitors that stumbled upon the site randomly) I argue that the number of these newcomers is likely to be small in comparison to the core audience size when the site is well established (as opposed to newly created). Furthermore, some of these newcomers may convert to regulars and contribute to the core audience size increase thus supporting the assumption that at any given time the core audience is likely to be much larger than the number of newcomers for an established site.

Preferably, the method for estimating unique visitors should receive input from an existing cookie tracking/user access logging system, which serves as a basis for calculating the number of unique visitors according to the following formula:

$$I \equiv I_0 U = U(C_0 + X N) \quad (1)$$

where I is the count of unique cookies, U is the number of unique visitors, $C_0$ is a constant ($C_0=1$ when using unique cookie counts), X is the inflation factor, N is the visit number, an integer related to the sampling period t as:

$$N = t T^1 - 1 \quad (2)$$

where $T^1$ is the visitation frequency.

In other words N numbers return visits starting from zero.

For sites with multiple visitation frequencies a sum for all significant visitation frequencies $T_k^{-1}$ should be used:

$$I = \Sigma q_k U(C_k + X_k N_k) \quad (3)$$

where $q_k$ is the fraction of the core audience with the visitation period $T_k$, $0 < q_k < 1$, $N_k = t T_k^{-1} - 1$, and $C_k = 1$.

Alternatively, the method can be used to complement an existing access logging system without cookie tracking mechanism and thus rely only on unique network address counts to obtain the unique visitor estimates using the formulas (1) and (3). In this alternative scenario the variable I in expressions (1) and (3) refers to the count of unique network addresses (e.g. IP addresses); $C_0 \leq 1$, $C_k \leq 1$ when using unique IP address counts (for most practical purposes $C_0 \approx C_k \approx 1$).

In order to complete the calculation of the unique visitors the inflation factor X must be determined empirically by mining site access logs. The visitation frequency can be determined in many ways, including but not limited to the following:

- Automatically, e.g. via online surveying of visitors and/or content subscribers
- Manually, e.g. via off-line surveying of known site visitors or target demographic that is likely to contain the site visitors; online surveying current site visitors (e.g. via chat or other methods of online communication); etc.
- From mining site access logs and extracting the visitation frequency of unambiguously identified returning visitors (such as content subscribers, registered users identified by their logins, pins; repeat visitors identified by cookies, etc.)
- From mining repository of multitude of site access logs (e.g. generated by search engines, hosting providers, user tracking providers, etc.) and establishing averages for sites based on content category, target demographics, traffic volume, traffic patterns, etc.

For maximum accuracy the inflation factor X and the visitation frequency can be monitored continuously and adjusted periodically.

BRIEF DESCRIPTION OF THE DRAWINGS

FIG. 1 illustrates the unique network address count increase with time.

FIG. 2 illustrates the unique cookie count increase with time.

FIG. 3 depicts formulas used for computation of the unique visitor counts.

FIG. 4 illustrates the general process for determining the unique visitor counts according to the invented method.

FIG. 5 illustrates the process of determination of inflation factors $X_k$, visitation frequencies $T_k^{-1}$, and visitor fractions $q_k$.

FIG. 6 illustrates the preferred system for determining the unique visitor counts according to the invention FIG. 7 illustrates an alternative system for determining the unique visitor counts according to the invention

DETAILED DESCRIPTION OF THE PREFERRED EMBODIMENT

Contrary to the currently accepted notion both unique network address and unique cookie counts taken at face value provide a poor measure of unique visitors. The research conducted by the author based on the analysis of web site traffic logs [6] revealed persistent overestimation of unique visitors that grows linearly with time when unique network addressed (e.g. IP addresses) are used as a measure of unique visitors—FIG. 1.

The count of unique cookies—which is considered to be a more reliable measure than the count of unique addresses and a de-facto industry standard for determining the unique visitors—also grows linearly with sampling time—FIG. 2.

From this analysis the formulas for calculating the unique visitors U from the unique network address/unique cookie counts were derived—FIG. 3.

These new, surprising and highly unobvious findings were analyzed by the author and a novel method for estimating the unique visitors was developed, which is illustrated on FIG. 4. For an arbitrary sampling period t the method works as follows:

1. Visitor unique-identifying cookie value (and/or the network address) is recorded into a site access log for each user visit during the sampling interval t producing a combined count—I—of unique cookie values (and/or unique network addresses).
2. The average visitation frequency (or multiple dominant visitation frequencies) and the corresponding inflation factor (factors) are determined using one of the methods described in the Background section or previously determined values are retrieved.
3. Unique visitors (i.e. the core audience size)—U—are calculated using the formulas shown on FIG. 3: formulas (1)-(2) are used when the visitation period is dominated by a single dominant frequency; formulas (2)-(3) when there are multiple dominant visitation frequencies.

If the site is equipped with access logging system that allows unambiguously identifying at least a portion of return visitors (e.g. via their unique login ID or unique cookie value, etc.) and assuming that all M unambiguously identified users are characteristic of the entire population of all users the Step 2 can be comprised of the following sub-steps—FIG. 5:

1. For each such unambiguously identified user labeled with index i ($1 \leq i \leq M$):
    i. Maintain a record—the set $A_i(N)$—of or cookie values (or network addresses) as they change with each visit. Thus $A_i(N)$ is a series of pairs $\{A_N, t_N\}$ where $A_N$ is the visitor's cookie value (or network address) during the N-th visit that corresponds to the timestamp $t_N$, N=0, 1, 2 . . .
    ii. Once the set $A_i(N)$ is constructed determine visitation frequency $T_k^{-1}$ as the inverse of the average of the difference between all consecutive timestamps in the visit history—the set $A_i(N)$:

$$T_k^{-1} = <t_{N+1} - t_N>^{-1} \quad (4)$$

where <> denotes averaging.
2. From large set of all the calculated visitation frequencies $T_k^{-1}$ select a smaller subset of K (K<<M) dominant visitation frequencies and bin the sets $A_i(N)$ together according to the selected dominant visitation frequency thus reducing the number of working sets down to K:

$$A_i(N), 1 \leq i \leq M \rightarrow A_k(N), 1 \leq k \leq K (K<<M) \quad (5)$$

Note that the combined set $A_k(N)$ will contain all of the elements of the compounding sets $A_i(N)$ ordered by their timestamp t.

3. As the sets $A_k(N)$ are constructed by combining the sets $A_i(N)$ maintain the count $M_k$ of the number of visitor sets $A_i(N)$ that compound each set $A_k(N)$. From this number $M_k$ calculate the fraction $q_k$ of total visitors binned within each set $A_k(N)$ as:

$$q_k = M_k/M, \ 0 < q_k < 1 \quad (6)$$

4. From these K sets $A_k(N)$ build K new sets $I_k(N)$ where each element is the number of times the cookie value has changed (or the total number of unique network addresses) divided by N+1:

$$I_k(N) = (N+1)^{-1} \text{Count\_of\_Unique}(A_k(n), 0 \leq n \leq N) \quad (7)$$

Note that in the case of network addresses such as IP addresses $I_k(0)$ will be close to 1 (in fact $C_k \equiv I_k(0) \approx 1$), where as in the case of unique cookie counts $I_k(0)$ will be exactly 1 ($C_k \equiv I_k(0) = 1$). In both cases properly constructed sets $I_k(N)$ will contain an increasing sequence of floating point numbers that correspond to the average number of the cookie value changes (of the average count of unique network addresses) per visit.

5. If the number of unambiguously identified visitors $M_k$ binned within each set $I_k(N)$ is statistically significant then individual inflation factors $X_k$ can be calculated as follows:

i. Fit $X_k$ (e.g. using least-squares) assuming $I_k(N) = 1 + X_k N, N=0, 1, 2, \ldots$.

ii. Else assume that $X_i = X$ and fit X assuming that $I(N) = 1 + X N$, where $I(N)$ is derived from the set $A(N)$—that is a combination of all sets $A_k(N)$—according to equation (7).

iii. As a variation sets corresponding to statistically insignificant visitor counts can be merged with the nearest statistically significant set and the estimation of $X_k$ is performed for the merged set as described in step-i.

Alternatively, the inflation factors X or $X_i$ can be determined before hand from mining large quantities of historical site access logs that can be obtained from search engines or hosting providers. Such logs are automatically accessible to providers offering user-identification services since these providers can simply mine logs of their customers for fine-tuning the inflation factor X based on visitation period, volume of the site traffic, content, geography, traffic patterns, etc.

Similarly, significant visitation frequencies $T_k^{-1}$ and the corresponding visitor fractions $q_k$ can be determined by mining the multitude of logs and adopting averages for the site's category.

Alternatively, for potentially better accuracy and/or for verification of the results a site can choose to conduct an online or offline marketing survey asking users how frequently they visit the site. The obtained marketing data can be used to estimate $T_k^{-1}$, $X_k$ and $q_k$.

Finally, if the site has a large number of visitors and is equipped with user identification system that relies on user registration (user sign-on) and/or cookie-tracking, better results can be achieved if the values of $T_k^{-1}$, $X_k$ and $q_k$ are determined via mining of the historical site access logs focusing on unambiguously identified visitors. Such mining procedure and the determination of $T_k^{-1}$, $X_k$ and $q_k$ can be performed periodically for improved accuracy of the results.

An example of a preferred system implementing the described method is depicted on FIG. 6 where Visitor (3) connects to Internet Site (1). A conventional Visitor Identification/Cookie-Tracking System (2) maintains Visit Log (4) where it records visitor's User ID (if any), Cookie Value, Network Address, access date and other relevant information. The Unique Visitors Estimation Subsystem (5) disclosed in this patent reads this information from the Visit Log (4), which it then uses to estimate the unique visitors count according to the disclosed method. For improved accuracy the Unique Visitors Estimation Subsystem (5) can interface with the optional Additional Log Repository (7) that can be used to derive more accurate estimates of $X/X_k$, $q_k$ and $T_k$. For ultimate flexibility the values of $X/X_k$, $q_k$ and $T_k$ and other parameters can be entered manually into the Unique Visitors Estimation Subsystem (5) via the optional Configuration Interface (9). Finally, the numbers from both the traditional Visitor Identification/Cookie-Tracking System (2) and the invented Unique Visitors Estimation Subsystem (5) can be reported side by side using the Unique Visitors Reporting Interface (6). While it is sufficient to report only the unique visitors estimate produced by the Unique Visitors Estimation Subsystem (5) a value produced by the traditional Visitor Identification/Cookie-Tracking System (2) can also be reported for comparison.

An example of an alternative system implementing the described method is depicted on FIG. 7 where Visitor (3) connects to an Internet Site (1). In the alternative scenario the Internet Site (1) is not equipped with the elaborate Visitor Identification/Cookie-Tracking System (2) but instead is outfitted with the simple Visitor Access Logging System (8), which is be default available for virtually all Internet sites. The Visitor Access Logging System (8) maintains a Visit Log (4) where it records visitor's Network Address, access date and other relevant information. The Unique Visitors Estimation Subsystem (5) disclosed in this patent reads this information (focusing on Network Addresses) from the Visit Log (4), which it then uses to estimate the unique visitors count according to the disclosed method. The Unique Visitors Estimation Subsystem (5) requires input from the Configuration Interface (9) since it can no longer derive the $X/X_k$, $q_k$ and $T_k$ parameters from the Visit Log (4) due to limitations of the simple Visitor Access Logging System (5), except in the case when the Internet Site (1) allows unambiguously identifying at least a portion of return visitors (e.g. via their Logon or user ID) and this unique visitor identifier is written to the Visit Log (4). For improved accuracy the Unique Visitors Estimation Subsystem (5) can interface with the optional Additional Log Repository (7) that can be used to derive more accurate estimates of $X/X_k$, $q_k$ and $T_k$ than those provided by the Configuration Interface (9). Finally, numbers from the invented Unique Visitors Estimation Subsystem (5) and unique network address counts from the Visitor Access Logging System (8) can be reported side by side using the Unique Visitors Reporting Interface (6). While it is sufficient to report only the unique visitors estimate produced by the Unique Visitors Estimation Subsystem (5) unique network address counts from the Visitor Access Logging System (8) can also be reported for comparison.

Also, it follows from the equation (1) that for sampling interval t equal to one visitation period T the count of unique visitors U is exactly equal to the count of unique cookie values (U=I). In the case of network addresses the count of unique visitors U is approximately equal to the count of unique network addresses ($U=I/C_0 \approx I$). Thus simply counting unique network addresses/cookies during the sampling period t of one visitation period T gives a very accurate and simple estimate of unique visitors. This approach corresponds to yet another embodiment of this invention.

Although the description above contains much specificity, these should not be construed as limiting the scope of the invention but as merely providing illustration of the presently preferred embodiment of this invention. For example, it is conceivable that other forms of visitor identification will be developed in the future to supersede network addresses and cookies. As long as such newly introduced IDs are not guaranteed to be truly unique and/or are subject to change the method and system disclosed above still applies.

It will be appreciated that numerous modifications of the embodiments described can be effected within the scope of this invention.

References
1. M. Gery and H. Haddad: "Evaluation of Web Usage Mining Approaches for User's Next Request Prediction", Fifth International Workshop on Web Information and Data Management (WIDM'03), IEEE, pp. 74-81, 2003
2. O. Nasraoui, H. Frigui, A. Joshi, and R. Krishnapuram, "Mining Web Access Logs Using Relational Competitive Fuzzy Clustering", Eight International Fuzzy Systems Association World Congress (IFSA 99), IEEE, 1999
3. F. Giannotti, C. Gozzi, G. Manco, "Characterizing Web user accesses: a transactional approach to Web log clustering", Proceedings of the International Conference on Information Technology: Coding and Computing (ITCC'02), IEEE, pp. 3-12, 2002
4. B. Thomas, "Burnt offerings [Internet]", Internet Computing, IEEE, vol. 2, pp. 84-86, 1998
5. R. Iváncsy and S. Juhász, "Analysis of Web User Identification Methods", International Journal of Computer Science, vol. 2, no. 3, pp. 212-219, 2007
6. M. Fomitchev, "On the Relationship Between Unique Users, Unique Cookies and Unique IP Addresses", IEEE Transactions on Networking, 2009, submitted for publication
7. A. Lipsman, "Cookie-Based Counting Overstates Size of Web Site Audiences," comScore, Press Release, http://www.comscore.com/press/release.asp?id=1389, 2007

What is claimed is:

1. A computer method for calculating the unique visitors during the a specified sampling period where unique visitors are related to the unique visitor identifiers using the an inflation factor that depends on the specified sampling period; further comprising the following steps of: maintaining the visit log during the said sampling period where the said visit log includes but is not limited to visitor identifiers such as network address, cookie, or logon ID and visit date; inputting from configuration or determining from the plurality of the additional log repositories or from the said visit log the significant visitation frequencies, the inflation factors, and corresponding user fractions; and calculating the unique visitors as a ratio of the count of the unique user identifiers to the sum by all significant visitation frequencies of the product of the inflation factor and the corresponding visit number.

2. The method in claim 1 where the said unique visitor identifiers are network addresses, IP addresses, or cookies.

3. The method in claim 1 where the said inflation factor depends on the visitation frequency.

4. The method in claim 3 where the said inflation factor grows with the increase of the visitation frequency or with increase of the sampling period.

5. The method in claim 1 where the said network address is IP address.

6. The method in claim 1 where only one visitation frequency is assumed.

7. The method in claim 1 where all said inflation factors are assumed equal.

8. The method in claim 1 where the said additional log repository comprises a multitude of visit logs obtained from search engines or hosting providers.

9. The method in claim 8 where the said multitude of visit logs comprises third party logs or the historical visit logs for the site for which the unique visitors are being calculated.

10. A method for calculating the unique visitors where the said user identifiers are sampled for exactly one visitation period and the total count of the unique identifiers is equated to the an estimate of the unique visitors; wherein the said visitation period is determined automatically by mining the site's historical visit logs or the additional log repository comprising the multitude of third party logs.

11. A method in claim 10 where the said unique identifiers are network addresses, IP addresses or cookies.

12. A method in claim 10 where the said visitation period is inputted from configuration or entered manually.

13. A method in claim 10 where the said mining involves identifying unambiguously identified users and using the obtained sample of the unambiguously identified users for calculating the dominant visitation frequencies, the corresponding inflation factors, and the visitor fractions.

14. A method in claim 13 where the said unambiguously identified users are determined via their User IDs/Logon IDs, or their cookie values, or their navigation patterns.

15. A computerized system, with a processor and a memory, for unique visitors estimation comprising the an Internet site, the a visitor identification or cookie tracking or visitor access logging system that records unique visitor identifier including but not limited to User ID/Logon ID, network address, cookie value into the a visit log, and the an unique visitors estimation subsystem that calculates the unique visitors as a ratio of unique visitor identifier counts to the sum by all significant visitation frequencies of the product of the inflation factor and the corresponding visit number.

16. A system in claim 15 where the unique visitors estimation subsystem obtains the significant visitation frequencies, the corresponding inflation factors, and user fractions from the visit log or from the configuration interface or from the plurality of historical visit logs or from the plurality of additional log repositories.

* * * * *